United States Patent [19]

Tschannen

[11] 4,281,347

[45] Jul. 28, 1981

[54] CORRECTION CIRCUIT FOR IMPROVING THE SHARPNESS OF CONTOUR OF VIDEO IMAGES

[75] Inventor: Gottfried Tschannen, Zürich, Switzerland

[73] Assignee: Siemens-Alris AG, Zürich, Switzerland

[21] Appl. No.: 124,792

[22] Filed: Feb. 26, 1980

[30] Foreign Application Priority Data

Mar. 8, 1979 [CH] Switzerland ............... 2225/79

[51] Int. Cl.³ ............................................. H04N 5/14
[52] U.S. Cl. ............................ 358/166; 358/37
[58] Field of Search ............ 358/160, 162, 163, 166, 358/37; 364/515, 724

[56] References Cited

U.S. PATENT DOCUMENTS

| | | | |
|---|---|---|---|
| 3,030,440 | 4/1962 | Schade, Sr. | 358/162 |
| 3,919,473 | 11/1975 | Cotter | 358/163 |
| 3,988,602 | 10/1976 | Gorsiga, Jr. | 358/166 |
| 4,127,873 | 11/1978 | Katagi | 358/166 |
| 4,212,072 | 7/1980 | Huelsman | 358/166 |

OTHER PUBLICATIONS

Improved Digital Aperture Corrector, by Deeley et al., Proceedings of the Institution of Electrical Engineers, vol. 121, No. 0, 9/74, pp. 929-934.
Digital and Anolog Enhancement Techniques, by Yves Faroudja, SMPTE Journal, vol. 87, No. 1, 1/78, pp. 24-28.
Enhanced Scintigraphic Information Display Using Computer-Generated Ratio Techniques, by Bell, Journal of Nuclear Medicine, vol. 11, No. 11, 11/70, pp. 655-659.

*Primary Examiner*—Howard Britton
*Assistant Examiner*—Tommy P. Chin
*Attorney, Agent, or Firm*—Werner W. Kleeman

[57] ABSTRACT

A correction circuit for improving the contour sharpness or quality of video images in devices wherein the video signals are converted into digital form. An even number of series connected multi-stage shift registers is provided, whose inputs are each connected by means of a related multiplier with inputs of an adder. The outputs of the last shift register are connected by means of a further multiplier with further inputs of the adder. Moreover, the multiplication factors of the multipliers form a symmetrical series having an absolute maximum at the center of the series, and the absolute value of the multiplication factor of the intermediate multiplier is greater than the absolute value of all other multiplication factors. The sign of the intermediate multiplier or multiplication factor is opposite to the sign of the algebraic sum of all other multiplication factors.

9 Claims, 6 Drawing Figures

CORRECTION CIRCUIT FOR IMPROVING THE SHARPNESS OF CONTOUR OF VIDEO IMAGES

BACKGROUND OF THE INVENTION

The present invention relates to a new and improved construction of a correction circuit for improving the contour quality or sharpness of video images in equipment or devices where the video signals are present in digial form.

During the recording of television images under difficult conditions, for instance by means of a malfunctioning transmission channel, there exists the problem of processing the video signals such that the contour sharpness of the received image is as good as possible. This problem likewise is of importance during the recording of video signals by means of a thermal image device. For the recording of video images it is, for instance, known to the art to record the object which is to be imaged by means of a video device which converts the optical image into electrical signals, which are then converted into digital signals in a subsequently connected analogue-digital converter. The digital signals can be written into an intermediate storage according to a first writing standard and again read-out according to a second reading standard. The digital video signals which are present in the second standard, following conversion in a subsequently connected digital-analogue converter, can be infed to a video reproduction device.

With such type equipment it is possible to receive video signals in a first standard and to further transmit the same in a second standard. Without additional measures it is however not possible with such equipment to improve the sharpness of contour of the image.

SUMMARY OF THE INVENTION

It is a primary object of the present invention to provide a new and improved construction of correction circuit which, during the imaging of an object at a screen, insures for increased contour sharpness or quality of the image.

According to the invention there is provided a correction circuit for impriving the contour sharpness or clarity of video images in devices wherein the video signals are converted into digital form. An even number of series connected multi-stage shift registers is provided, whose inputs are each connected by means of a related multiplier with inputs of an adder. The outputs of the last shift register are connected by means of a further multiplier with further inputs of the adder. Moreover, the multiplication factors of the multipliers form a symmetrical series having an absolute maximum at the center of the series, and the absolute value of the multiplication factor of the intermediate multiplier is greater than the absolute value of all other multiplication factors. The sign of the intermediate multiplication factor is opposite to the sign of the algebric sum of all other multiplication factors.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
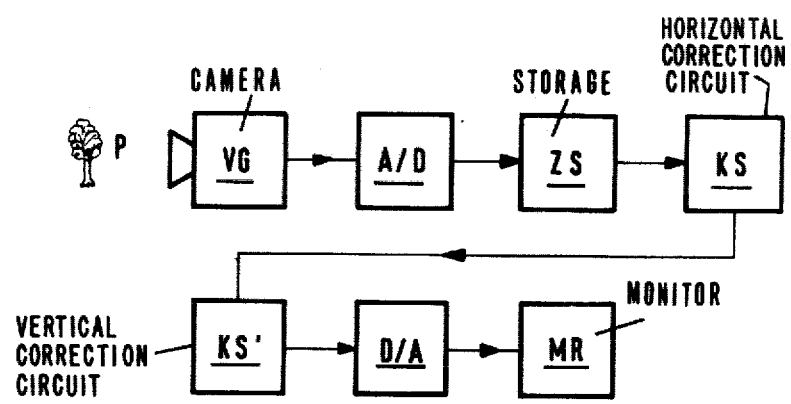
FIG. 1 illustrates the principle construction of equipment according to the invention.

Describing now the drawings, the apparatus shown in FIG. 1 comprises a video device or camera VG, which reproduces the image of an object P and converts such into video signals. These video signals are then infed by means of an analogue-digital converter A/D to the input of an intermediate storage ZS, whose outputs are connected by means of two series connected correction circuits KS and KS' with appropriate inputs of a digital-analogue converter D/A, at which there is connected the video playback device or monitor MR. In contrast to a heretofore known apparatus having a video device, an analogue-digital converter, an intermediate storage, a digital-analogue converter and a monitor, the apparatus of FIG. 1 additionally contains two correction circuits KS and KS', which are incorporated in circuit between the intermediate storage ZS and the digital-analogue converter D/A, by way of example. The function of such correction circuits is to improve the video signals such that the image at the monitor MR appears with improved image sharpness. The correction circuits KS and KS' could also be connected in circuit between the analogue-digital converter A/D and the intermediate storage ZS.

Figure 4:
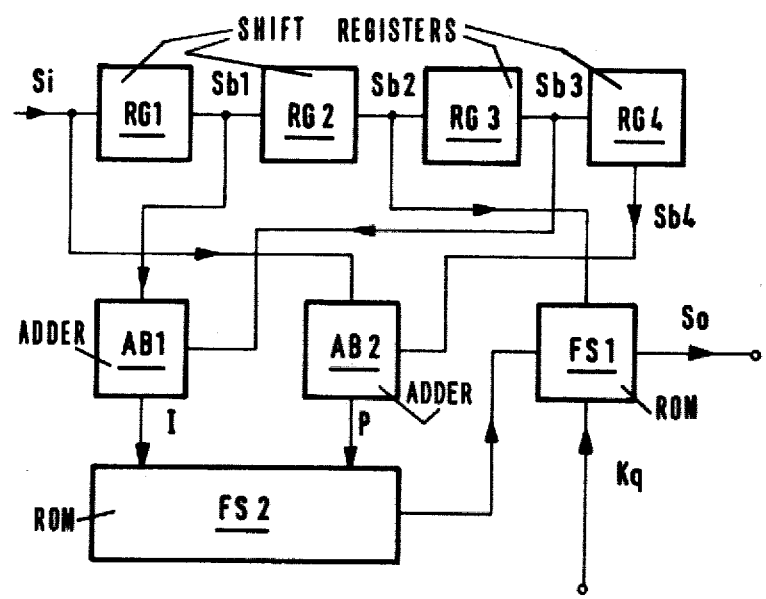
FIG. 4 is a second embodiment of inventive correction circuit.
Figure 2:
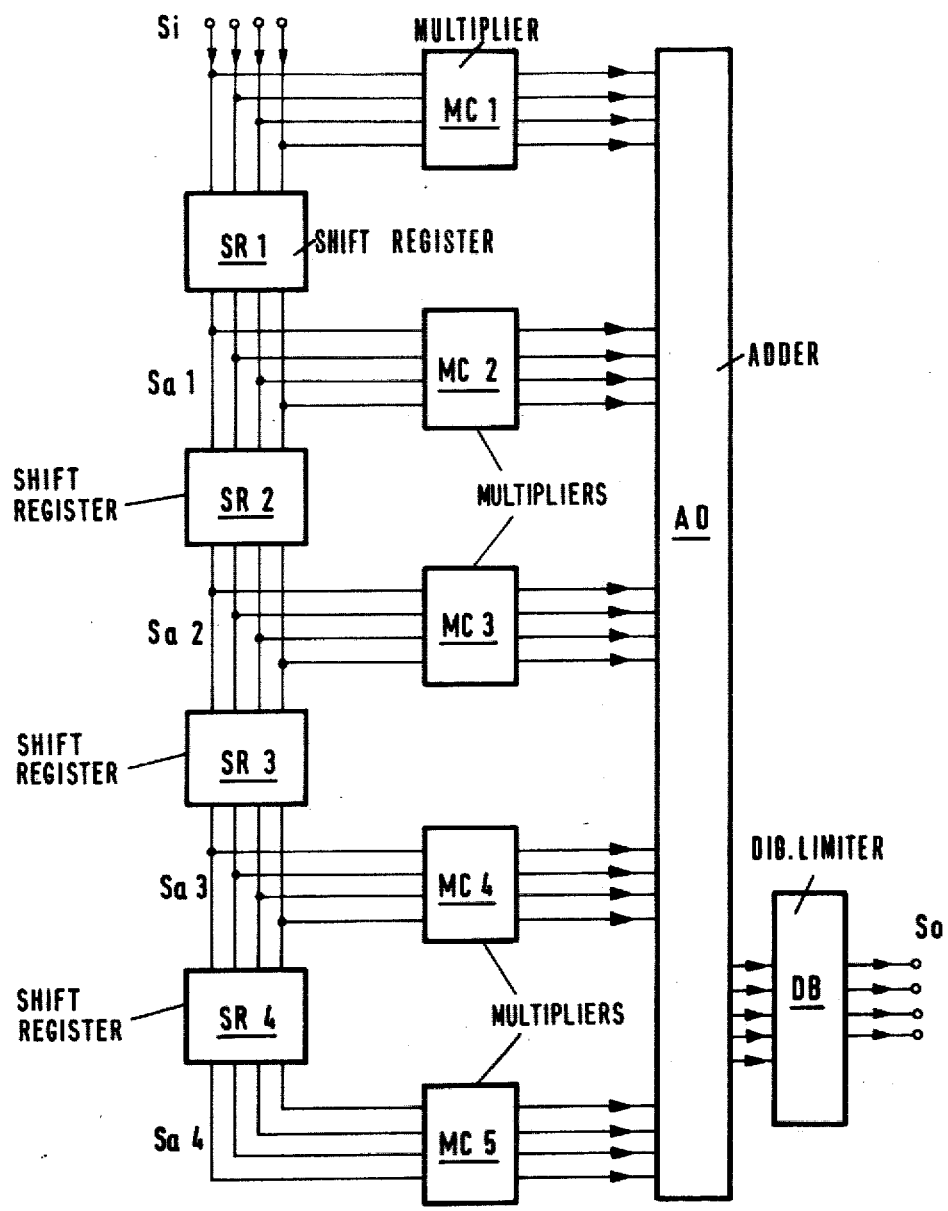
FIG. 2 is a first exemplary embodiment of correction circuit designed according to the invention.
Figure 5:
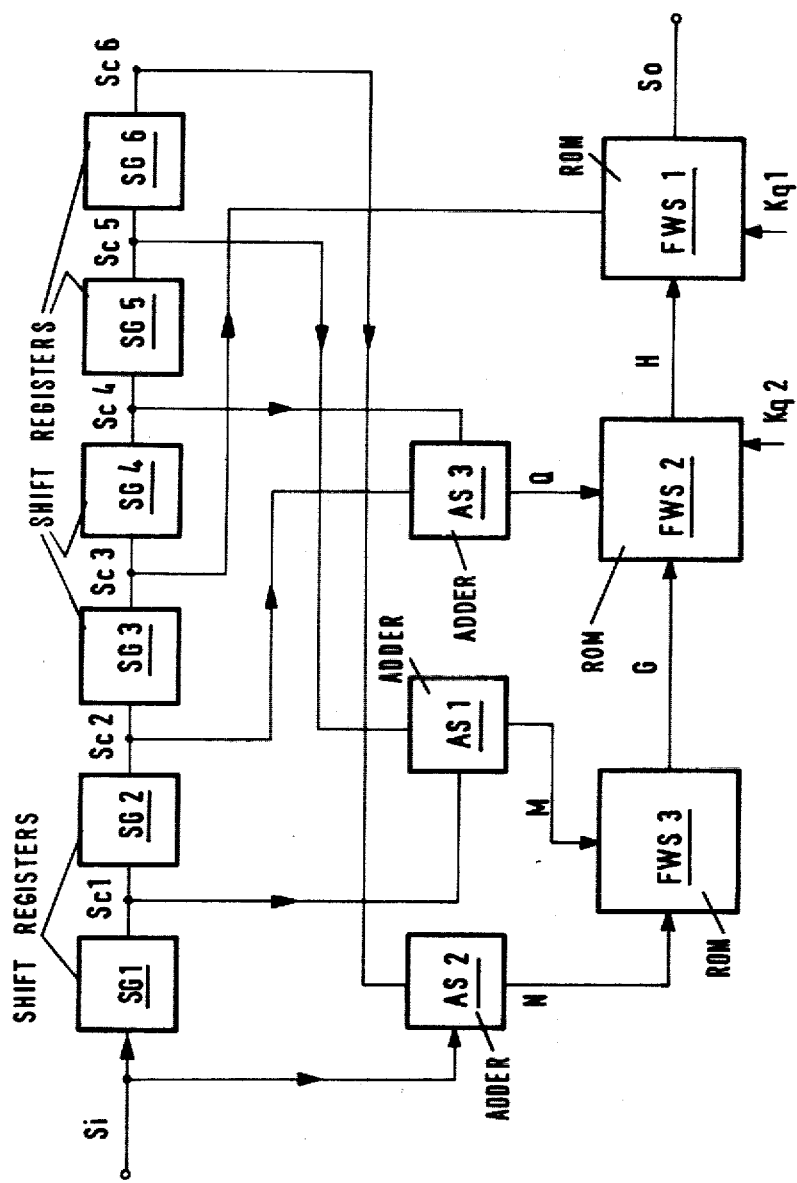
FIG. 5 is a third embodiment of inventive correction circuit.

Suitable for use as the correction circuit KS and/or KS' in the equipment arrangement of FIG. 1 are, for instance, the different embodiments of correction circuits according to one of the FIGS. 2, 4 or 5.

In FIG. 2 there is illustrated a correction circuit containing four series connected four-stage shift registers SR1, SR2, SR3, SR4, five multipliers MC1, MC2, MC3, MC4, MC5 and an adder AD. The first four multipliers MC1, MC2, MC3, MC4 each contain four respective inputs which are connected with a respective input of one of the shift registers SR1, SR2, SR3 and SR4, respectively, and further contain four respective outputs connected with an input of the adder AD. The fifth multiplier MC5 likewise possesses four inputs each connected with an output of the last shift register SR4 and four outputs each connected with a further input of the adder AD. The adder AD has connected thereafter a digital limiter circuit DB, which converts a 5-bit-output signal of the adder AD into a 4-bit output signal So of the correction circuit KS.

A 4-bit-signal Si at the four inputs of the shift register SR1 are thus transformed by means of the correction circuit (FIG. 2) into this 4-bit-signal So at the four outputs of the limiter circuit DB while taking into account the value of five adjacently situated image spots or points.

The correction circuit KS is provided for improving the image quality or contrast in horizontal direction. An exactly similarly constructed correction circuit KS', containing however different shift registers, can be connected in series with the correction circuit KS, in order to improve the image also in vertical direction. In this connection it is insignificant in which sequence the correction circuits KS and KS' are connected in series with one another.

Reverting again to FIG. 2 there will now be explained the function of the correction circuit thereof which is as follows:

If the recording of the video images is not carried out under difficult conditions, rather under particularly favorable conditions, then in the ideal case there would appear, for instance, a correct step function signal Si=S(5) (FIG. 3) instead of the falsified jump or step function signal Si=Sr(5) at the four imputs of the shift register SR1, and the correction circuits KS and KS' (FIG. 1) would not be needed at all.

Figure 3:
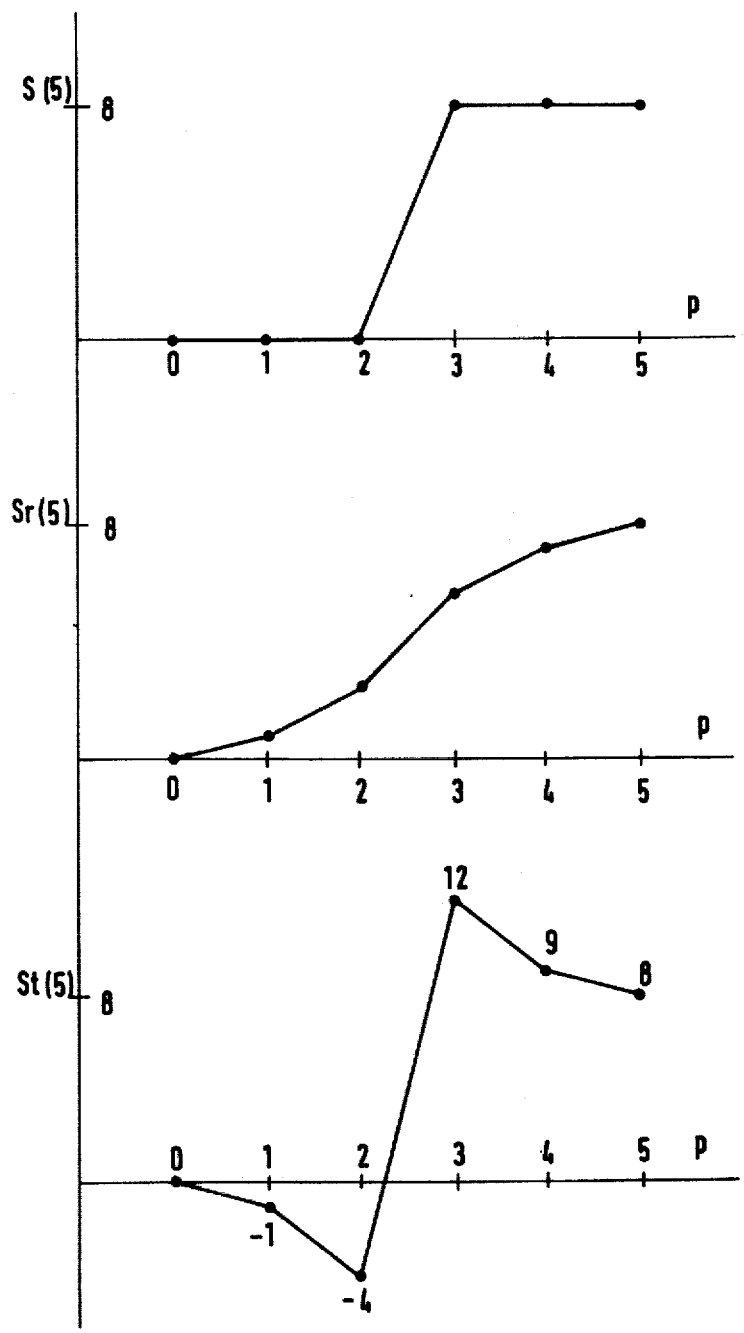
FIG. 3 is a time diagram of different signals.

In FIG. 3 there are illustrated the analogue values, corresponding to the relevant 4-bit-values, of the signals S(5), Sr(5) and St(5) for p=5 adjacently situated image spots or points. As to these five image spots the correct signal S(5) has the following coordinate values:

S(5):(1;0), (2;0), (3;8), (4;8), (5;8)

wherein there can be observed a clear jump or surge of the ordinates from the value 0 to the value 8. Hence, there is generally valid for an ordinate value Si the following relationship:

$$Si = e1 \cdot 2^0 + e2 \cdot 2^1 + e3 \cdot 2^2 + e4 \cdot 2^3$$

wherein e1, e2, e3, e4 designate the four bits, by means of which there can be indicated up to $2^4 = 16$ grey stages of an image spot. Of course, the embodiment under discussion is not limited to this number of sixteen grey stages.

The coordinates of the corresponding five image spots for the falsified signal Si=Sr(5) at the input of the correction circuit KS can be assumed for a practical case to possess, for instance, the following approximate values:

Sr(5): (1;0.8), (2;2.4), (3;5.6), (4;7.2)

wherein the previous present clear jump of the ordinates from the value 0 to the value 8 no longer is present.

Now it is assumed that by means of the correction circuit KS an input signal Si, identical with the correct step function or jump signal S(5) illustrated in FIG. 3, is converted into an output signal So=St(5) having the following coordinate values:

St(5): (1;-1), (2;-4), (3;12), (4;9), (5;8).

Due to this transformation there is approximately satisfied the condition Sr(5)+St(5)=2·S(5).

The ordinate values for S(5), Sr(5) and St(5) therefore can be considered as vectors, wherein the vector St(5) is transformed from the vector S(5) in n=5 steps.

Therefore, a correction circuit KS or KS' generally transforms an input signal vector Si(n) into an output signal vector So(n) in such a manner that there is valid the following equation:

$$So(n) = Si(n,p) \cdot C(n)$$

wherein, by means of the vector C(n)=C(5) there is represented the mutliplier factors C1 to C5 of the multi-pliers MC1 to MC5 (FIG. 2) and by Si(n,p) there is represented the input signal matrix.

For the relationship Si(n,p)=Si(5,5) with $$Si(5,5) = \begin{pmatrix} 1 & 0 & 0 & 0 & 0 \\ 1 & 1 & 0 & 0 & 0 \\ 1 & 1 & 1 & 0 & 0 \\ 1 & 1 & 1 & 1 & 0 \\ 1 & 1 & 1 & 1 & 1 \end{pmatrix}$$

there results $$C(5) = Si(5,5)^{-1} \cdot So(5) = \begin{pmatrix} 1 & 0 & 0 & 0 & 0 \\ -1 & 1 & 0 & 0 & 0 \\ 0 & -1 & 1 & 0 & 0 \\ 0 & 0 & -1 & 1 & 0 \\ 0 & 0 & 0 & -1 & 1 \end{pmatrix} \cdot \begin{pmatrix} -1 \\ -4 \\ 12 \\ 9 \\ 8 \end{pmatrix} \cdot i =$$

$$\begin{pmatrix} -1 \\ -3 \\ 16 \\ -3 \\ -1 \end{pmatrix} \cdot i$$

wherein $i$ constitutes a standardizing factor and the values $-1, -4, 12, 9$ and 8 are discretionarily chosen such that there is approximately satisfied the relationship Sr(5)+St(5)=2·S(5).

Hence, if the multipliers MC1 to MC5 contain the mutliplier factors

C1=C5=−1; C2=C4=−3; C3=2 then there appears an output signal So which owing to the inverting matrix transformation $Si(5,5)^{-1}$ is improved in relation to the input signal Si.

The individual storage contents of the four-stage shift registers SR1 to SR4 of the correction circuit KS illustrated in FIG. 2, corresponds to the individual brightness values of the individual discrete image spots located next to one another. For the improvement of the contour quality or sharpness in horizontal direction there are provided the shift registers SR1 to SR4 each having a respective storage location or cell per stage.

The values in the shift registers SR1, SR2, SR3 and SR4 are now multiplied with the factors C2, C3, C4 and C5, respectively, and the input value at the shift register SR1 is multiplied by the multiplier factor C1. The multiplied values are then added in the adder or summing device AD, whose output signal constitutes a signal which is improved in relation to the contour quality in horizontal direction. In the subsequently connected digital limiter circuit DB there are limited the 5-bit-input signals as 4-bit-video signals, whose illustrated values correspond to the 16 grey stages or shades of grey. Thus, input signals, corresponding to a negative value, are outfed as a null-grey stage value-output signal, and input signals, corresponding to a value of more than 15 grey stages or shades of grey, are outfed as a 15-grey stage value-output signal. In all other instances the output signal remains equal to the input signal.

The C(5) vector (−1, −3, +16, −3, −1): 8 can generally have the following form:

(−f, −g, +h, −g, −f).

There is valid the relationship $$|h|>|f|, |h|>|g|$$

and $$\text{sign }(h) = -\text{sign }(-f-g).$$

In order to improve the contour quality in the vertical direction this 4-bit-signal So can be delivered to a second correction circuit KS' having four four-stage shift registers, which for instance each have 512 storage cells per stage, and the number of spots per line amounts to 512 and each stage corresponds to a bit value of the 4-bit-signal.

The correction circuit illustrated in FIG. 4 possesses four series connected four-stage shift registers RG1, RG2, RG3, RG4 each having a respective storage cell per stage. The output of the first shift register RG1 is connected with the first input and the output of the third shift register RG3 is connected with the second input of a first adder cicuit AB1 and the input of the first shift register RG1, receiving the input signal Si, is connected with the first input and the output of the fourth shift register RG4 is connected with the second input of a second adder circuit AB2. These connections can be constituted by multi-wire conductors, for instance for the transmission of digital signals e1, e2, . . . en, by means of which there can be represented the input signal Si.

The n-bit-output signal of the second shift register RG2 is infed to corresponding inputs of a first read-only memory FS1, delivering the improved n-bit-output signal So, this read-only memory FS1 having infed at its input side, on the one hand, a g-bit-control signal Kq and, on the other hand, receiving the n-bit-output signal of a second read-only memory FS2. This second read-only memory FS2 is connected, on the one hand, with the output of the first adder circuit or adder AB1 and, on the other hand, with the output of the second adder circuit AB2, by means of a respective (n+1)-bit-conductor or line, since an additional line is necessary in consideration of the addition transfer.

The correction circuit of FIG. 4 functions in the following manner:

Si, Sb1, Sb2, Sb3, Sb4 constitute the input signal and the signals at the output of the first, second, third and fourth shift registers RG1, RG2, RG3, RG4, and So constitutes the output signal of the correction circuit. There are valid the following relationships:

$$Si=(e1, e2, \ldots en)$$

$$Sb1=(w1, w2, \ldots wn)$$

$$Sb2=(x1, x2, \ldots xn)$$

$$Sb3=(y1, y2, \ldots yn)$$

$$Sb4=(z1, z2, \ldots zn)$$

$$So=(a1, a2, \ldots an)$$

In the adder circuits AB1 and AB2 there are formed the sums $$Sb1+Sb3=(w1+y1, w2+y2, \ldots wn+yn)=I$$

and $$Si+Sb4=(e1+z1, e2+z2, \ldots en+zn)=P.$$

The read-only memory FS2 is programmed such that it delivers an output signal F=(F1, F2, F3, F4) satisfying the equation:

$$F=(P\cdot f+I\cdot g) \text{ or } F=(P+3\cdot I):8$$

wherein the values f and g of the above-mentioned vector (−f, −g, +h, −g, −f) are determined.

The read-only memory FS1 is programmed such that it delivers an output signal So which satisfies the equation:

$$So=(\tfrac{1}{2})\cdot h\cdot Sb2+((\tfrac{1}{2})\cdot h\cdot Sb2-F)\cdot Kq$$

wherein Kq is a function of q-random binary signals.

Thus, for instance, for Kq=1, f=⅛, g=⅜ and h=16/8

$$So=(-Si-3\cdot S1+16\cdot S2-3\cdot S3-S4):8$$

in coincidence with the result that there can be obtained as the addition of the product of the signal values Si, Sa1, Sa2, Sa3, Sa4 with the weighting (−1, −3, 16, −3, −1):8 also in a correction circuit KS according to FIG. 2.

By means of the signal Kq there can be modified the vector (−f, −g, +h, −g, −f). For instance, Kq can assume the values 0; 0.5; 1 and 2.

In a correction circuit KS' according to FIG. 4 for the improvement of the contour quality in vertical direction there must likewise be provided shift registers which contain as many storage cells as there are image points or spots per line according to a corresponding standard.

The correction circuit KS illustrated in FIG. 5 possesses six series connected n-stage shift registers SG1, SG2, SG3, SG4, SG5, SG6 each having a respective storage cell per stage. The output of the first shift register SG1 is connected with the first input of a first adder circuit AS1 and the output of the fifth shift register SG5 with the second input of such first adder circuit AS1. Moreover, the input of the first shift register SG1, receiving the input signal Si, is connected with the first input of a second adder circuit AS2, and the output of the sixth shift register SG6 is connected with the second input of this second adder circuit AS2. The output of the second shift register SG2 is connected with the first input of a third adder circuit AS3 and the output of the fourth shift SG4 is connected with the second input of this third adder circuit AS3. Hence, these connections consist of multi-wire lines or conductors, for instance for the transmission of n-digital signals e1, e2, . . . en, by means of which there can be represented the input signal Si.

The n-bit-output signal of the third shift register SG3 is infed to corresponding inputs of a first read-only memory FWS1, delivering the improved n-bit-output signal So. The input side of this read-only memory FWS1 has infed thereto, on the one hand, a q1-bit-control signal Kq1 and, on the other hand, the n-bit-output signal of a second read-only memory FWS2. This second ROM or read-only memory FWS2 is connected, on the one hand, by means of a (n+1)-line or conductor with the output of the adder circuit AS3 and, on the other hand, with the output of a third read-only memory FWS3. The input side of this third ROM or read-only memory FWS3 is connected by means of a respective (n+1)-line with a respective input of the adder circuits AS1 and AS2. These three (n+1)-lines or conductors are necessary at the outputs of the three adder circuits AS1, AS2, AS3 because of the addition transfer.

The read-only memory FWS2 has applied thereto, by means of an additional input, a further q2-bit-control signal Kq2.

The correction circuit KS of FIG. 5 functions in the following manner:

Si, Sc1, Sc2, Sc3, Sc4, Sc5, Sc6 constitute the input signal and the signals at the output of the first, second, third and sixth shift registers SG1, SG2, SG3, SG4, SG5, SG6 and So represents the output signal of the correction circuit. There are valid the following relationships:

$$Si = (e1, e2, \ldots en)$$

$$Sc1 = (u1, u2, \ldots un)$$

$$Sc2 = (v1, v2, \ldots vn)$$

$$Sc3 = (x1, x2, \ldots xn)$$

$$Sc4 = (y1, y2, \ldots yn)$$

$$Sc5 = (z1, z2, \ldots zn)$$

$$Sc6 = (a1, a2, \ldots an).$$

In the adder circuits AS1, AS2 and AS3 there are formed the sums $$Sc1 + Sc5 = M$$

$$Si + Sc6 = N$$

and $$Sc2 + Sc4 = Q, \text{ respectively.}$$

The read-only memory FWS 3 is programmed such that it delivers an output signal G which satisfies the equation:

$$G = (N \cdot i + M \cdot j)$$

whereby there are determined the values i and j of a vector $(-i, -j, -k, +h, -k, -j, -i)$.

The read-only memory FWS2 and FWS1 are programmed such that they deliver a respective output signal H and So satisfying the relationship $$H = (Q \cdot k + G) \cdot Kq2$$

and $$So = \frac{h}{2} \cdot Sc3 + \left( \frac{h}{2} \cdot Sc3 - H \right) \cdot Kg1, \text{ respectively.}$$

for Kq1 = Kq2 = 1, i = 1, j = 1, k = 1 and h = 14 there is satisfied for instance the relationship:

$$So = -i \cdot Si - j \cdot Sc1 - k \cdot Sc2 + h \cdot Sc3 - -k \cdot Sc4 - j \cdot Sc5 - i \cdot Sc6$$

in coincidence with the result that there can be obtained as the addition of the products of the signal values Si, Sc1, Sc2, Sc3, Sc4, Sc5, Sc6 with the weightings $(-i, -j, -k, +h, -k, -j, -i)$ also in a correction circuit KS of the type shown in FIG. 2, however containing six shaft registers.

The factors i, j, h and k can be chosen such that there are satisfied the conditions:

$$|h| > |i|, \quad |h| > |j|, \quad |h| > |k|$$

and $$\text{sign}(h) = -\text{sign}(-i-j-k).$$

Figure 6:
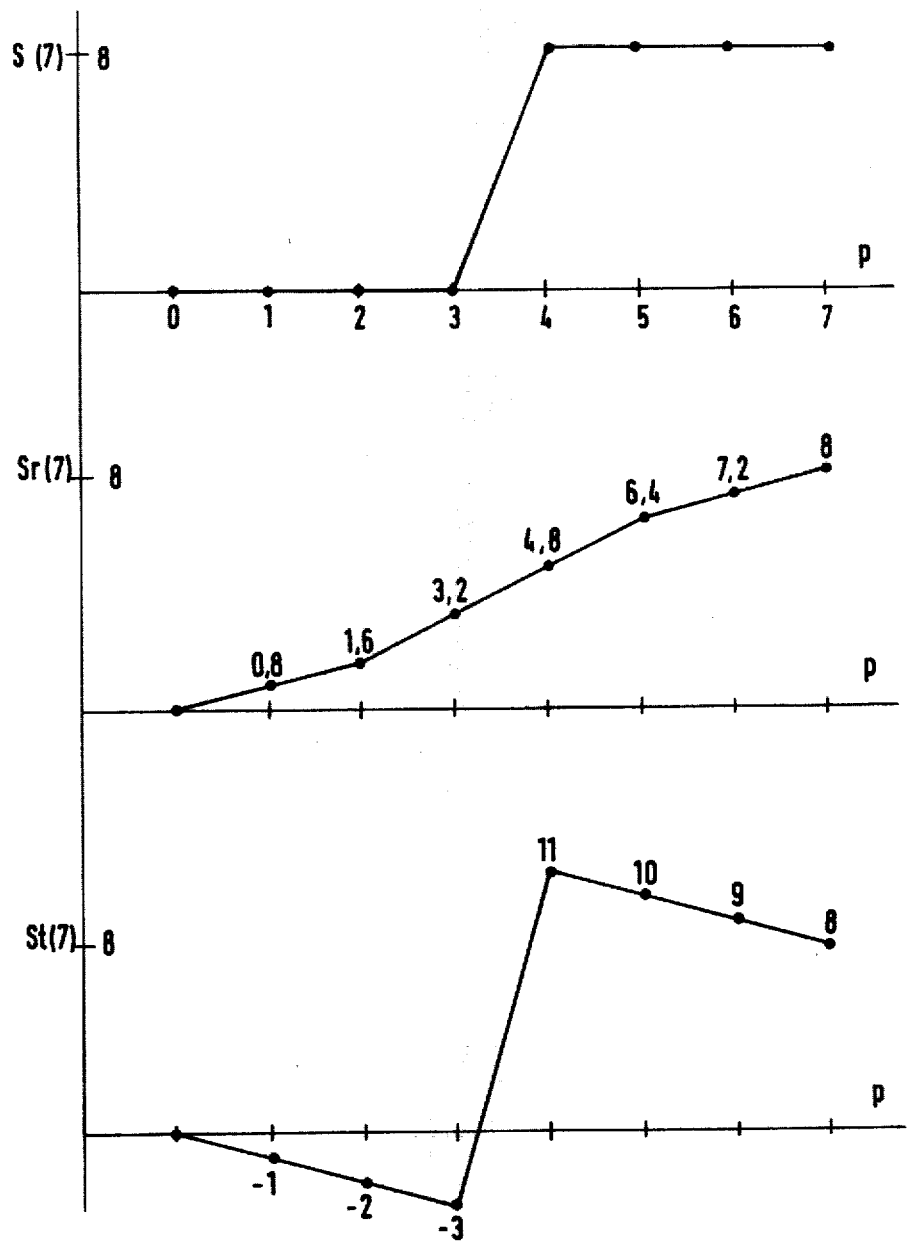
FIG. 6 illustrates a second time diagram for different signals.

As a numerical example there is given the vector $(-1, -1, -1, +14, -1, -1, -1)$ (FIG. 6). Generally, the values of the weightings, i, j, k and h need not be integers.

Although the read-only memories of the correction circuits of FIGS. 4 and 5 can be replaced by a single read-only memory, division thereof into a number of ROM's is less complicated.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A correction circuit for improving the contour quality of video images in devices where the video signals are converted into digital form, comprising:
   an even number of series connected multi-stage shift registers, each having input means;
   a respective multiplier operatively associated with each of the shift registers;
   adder means having inputs and an output side;
   the input means of the shift registers being connected by their related multipliers with related inputs of the adder means;
   each of the shift registers having output means;
   a further multiplier for connecting the outputs of the last shift register with further inputs of the adder means;
   the multiplier factors of the multipliers constitute a symmetrical series having an absolute maximum at the center of the series;
   the absolute value of the multiplier factor of one of said multipliers defining an intermediate multiplier is greater than the actual value of all other multiplier factors;
   the sign of the intermediate multiplier factor being opposite to the sign of the algebraic sum of all other multiplier factors; and
   a digital limiter circuit connected with the output side of said adder means for limiting the values representative of input signals of the correction circuit such that at an output of the digital limiter circuit there appears either as a multi-bit-video output signal a minimum-grey stage value output signal for input signals whose represented value is smaller than the value of a certain number of grey stages or a maximum-grey stage value-output signal for input signals whose represented value is greater than the value of a predetermined second number of grey stages, and in all other cases the relevant input signal remains unchanged.

2. The correction circuit as defined in claim 1, wherein:
   each of the shift registers has a respective storage cell per stage in order to improve the contour quality in horizontal direction.

3. The correction circuit as defined in claim 1, wherein:
the shift registers each have as many storage cells per stage as there are present image spots per line in order to improve the contour quality in vertical direction.

4. The correction circuit as defined in claim 1, further including:
a respective one of the correction circuits being connected in series in order to improve the contour quality in both horizontal and vertical direction.

5. The correction circuit as defined in claim 1, wherein:
said limiter circuit has a limiter function which is accomplished by read-only memories.

6. A correction circuit for improving the contour quality of video images in devices where video signals are converted into digital form, comprising:
an even number of series connected shift registers;
adder circuits with which there are operatively connected to said shift registers;
the number of adder circuits amounting to one-half of the number of shift registers;
each of the adder circuits adding the input signal of a predetermined shift register with the output signal of another shift register which is symmetrically arranged in the series of all shift registers;
at least one read-only memory which receives the output signal of the adder circuits and the output signal of the last of the first half of the shift registers;
said read-only memory delivering an improved video signal as the sum of the products of the input signals and the output signals of the shift registers with multiplier factors;
the absolute values of the multiplier factor of an intermediate multiplier being greater than the absolute value of all of the other multiplier factors; and
the sign of the intermediate multiplier factor is opposite to the sign of the algebraic sum of all of the other multiplier factors.

7. The correction circuit as defined in claim 6, wherein:
each of the shift registers has a respective storage cell per stage in order to improve the contour quality in horizontal direction.

8. The correction circuit as defined in claim 6, wherein:
the shift registers each have as many storage cells per stage as there are present image spots per line in order to improve the contour quality in vertical direction.

9. The correction circuit as defined in claim 6, further including:
a respective one of the correction circuits being connected in series in order to improve the contour quality in both horizontal and vertical direction.

* * * * *